United States Patent [19]

Ito

[11] Patent Number: 5,131,648
[45] Date of Patent: Jul. 21, 1992

[54] IMAGE RECORDING APPARATUS INHIBITING RECORDING OF ABNORMALLY-FED SHEETS

[75] Inventor: Masahiko Ito, Yokohama, Japan

[73] Assignee: Canon Kabushiki Kaisha, Tokyo, Japan

[21] Appl. No.: 452,116

[22] Filed: Dec. 18, 1989

[30] Foreign Application Priority Data

Dec. 16, 1988 [JP] Japan ................. 63-318023
Dec. 16, 1988 [JP] Japan ................. 63-318024

[51] Int. Cl.⁵ .................................... B65H 7/12
[52] U.S. Cl. ........................ 271/262; 271/265; 271/272
[58] Field of Search ............... 271/263, 262, 265, 259, 271/258, 272-274, 3, 10, 225, 280, 303, 176, 184

[56] References Cited

U.S. PATENT DOCUMENTS

| | | |
|---|---|---|
| 4,243,983 | 1/1981 | Vyas ............................. 271/263 X |
| 4,283,621 | 8/1981 | Pembroke ....................... 235/375 |
| 4,491,929 | 1/1985 | Ikoma et al. .................. 271/263 X |
| 4,577,956 | 3/1986 | Klosterhuber . |
| 4,605,926 | 8/1986 | Onishi et al. .................. 271/263 X |
| 4,819,034 | 4/1989 | Weinzierl . |
| 4,894,783 | 1/1990 | Milne ........................... 271/263 X |

FOREIGN PATENT DOCUMENTS

58-78936  5/1983  Japan ................. 271/263

Primary Examiner—David H. Bollinger
Attorney, Agent, or Firm—Fitzpatrick, Cella, Harper & Scinto

[57] ABSTRACT

An image recording apparatus inhibiting recording of abnormally-fed sheets includes conveying structure for conveying a sheet along a predetermined conveying path. Detection circuitry is provided for detecting a dimension of a sheet being fed by the conveying structure. A memory is provided for storing a reference value corresponding to a dimension of a sample sheet detected by the detection circuitry. Judging circuitry is provided for judging the abnormal feeding of a sheet by comparing the dimension of the sheet detected by the detection circuitry with the reference value stored in the memory. Reading circuitry is provided for reading information from the sheet, and a control circuit is provided for inhibiting the reading of the information from a sheet which is judged to have been abnormally fed, but for allowing the reading of the information from a sheet which has been judged to have been normally fed. Preferably, the detected dimension is the thickness and/or the length of the sheet.

12 Claims, 5 Drawing Sheets

IMAGE RECORDING APPARATUS INHIBITING RECORDING OF ABNORMALLY-FED SHEETS

BACKGROUND OF THE INVENTION

1. Field of the Invention

The present invention relates to an image recording apparatus wherein an original carrying an image is fed and the image is recorded on a recording medium.

2. Related Background Art

In the past, in order to reduce the storing space for storing a large number of documents such as chits or slips, the image information on such documents has been stored in microfilms, optical discs, magnetic discs or the like. However, in order to permit the easy retrieval or search (referred to generically as "search" hereinafter) of such information later, it was necessary to input index information (referred to as "index" hereinafter) corresponding to such image information, and it took a long time to input such an index.

Figure 7:
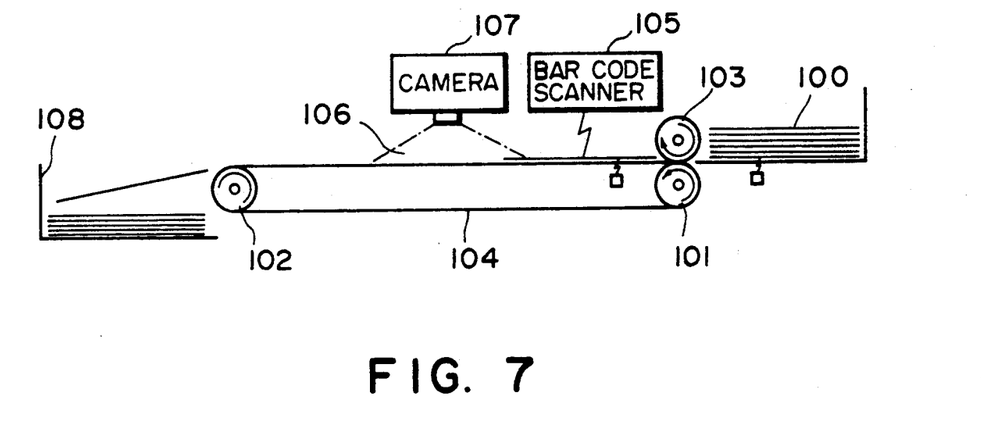
FIG. 7 is a schematic view showing a conventional reading apparatus.

As one of means for solving the above problem, an information reading apparatus has been proposed wherein code information such as a bar code is applied to each of the documents, and the code information is read by a reading mechanism such as a bar code scanner, MICR, OCR and the like and at the same time the image information carried by the document is taken or recorded, thus performing the image recording. Such information recording apparatus is shown in FIG. 7.

In this conventional information reading apparatus, originals 100 such as slips (onto each of which a bar code as an index is applied) are fed one by one by a conveying means comprising rollers 101, 102, 103 and a belt 104 toward an ejector tray 108, and the bar code on the original is read by a bar code scanner 105 and the image on the original 100 is photographed by a camera 107 in a taking station 106. The read bar code is inputted to a computer for preparing an easy and positive search in the future.

However, in the above-mentioned conventional apparatus, if plural originals 100 are fed simultaneously (referred to as "double-feeding" hereinafter) without being separated from each other, the bar code scanner 105 can merely read the bar code of the uppermost original 100 among the double-fed originals and cannot read the bar codes of the other originals. Further, since the originals are photographed by the camera 107 in the double-fed condition, the originals 100 other than the uppermost originals cannot be photographing. In addition, when photo-taking, since the camera is designed to focus on the image of a single original, the image on the uppermost original of the double-fed originals will be out of focus with respect to the camera, with the result that the image photographed by the camera will be indistinct.

Furthermore, if plural originals 100 are fed while being overlapped largely or partially (referred to as "overlap-feeding" hereinafter) without being completely separated from each other, only the bar code of the first or uppermost original will be read and only the image of the first original will be photographed, while the second and other originals will be merely fed without reading the bar codes thereof and photographing the images thereof.

Accordingly, the above-mentioned conventional apparatus has drawbacks that the cost of the recording is increased due to the useless reading (of the bar code) and photographing (of the image) and that, since the correctly read and photographed originals and the incorrectly read and incorrectly photographed (or non-read and non-taken) originals are intermixed due to the double-feeding and/or overlap-feeding, the later sorting operation will be troublesome.

If it is attempted to detect the abnormal conveying of the originals caused by the double-feeding and/or overlap-feeding the normally or correctly fed originals can be sorted from the abnormally fed originals and ejected independently of the latter. In this case, however, since it is necessary to determine a reference value for comparing the normally fed originals with the abnormally fed originals, if any originals having a value different from the reference value are used, all of such fed originals will be judged as abnormally fed originals. Accordingly, this attempt merely uses the exclusive original, and, thus, has less freedom and cannot be of practical use.

Further, the reading of the bar codes of not only the correctly fed originals (referred to as "normal original" hereinafter) but also the abnormally or incorrectly fed originals (referred to as "abnormal original" hereinafter) due to the double-feeding and/or the overlap-feeding excessively consumes electric power for the operation of the apparatus and increases the load an the reading means (such as a laser) due to the useless reading, thus shortening the service life of the reading means and accordingly hastening the replacement of the worn parts, which leads to increased cost.

SUMMARY OF THE INVENTION

The present invention aims to eliminate the above-mentioned conventional drawbacks, and, therefore, an object of the present invention is to discriminate normal originals from abnormal originals without fail, and to easily and freely determine a reference value used for judging whether any original is the normal original or the abnormal original.

Another object of the present invention is to provide an efficient operation for the apparatus by omitting or abbreviating further sequences of operation after the abnormal original has been detected.

DETAILED DESCRIPTION OF THE PREFERRED EMBODIMENTS

Figure 1:
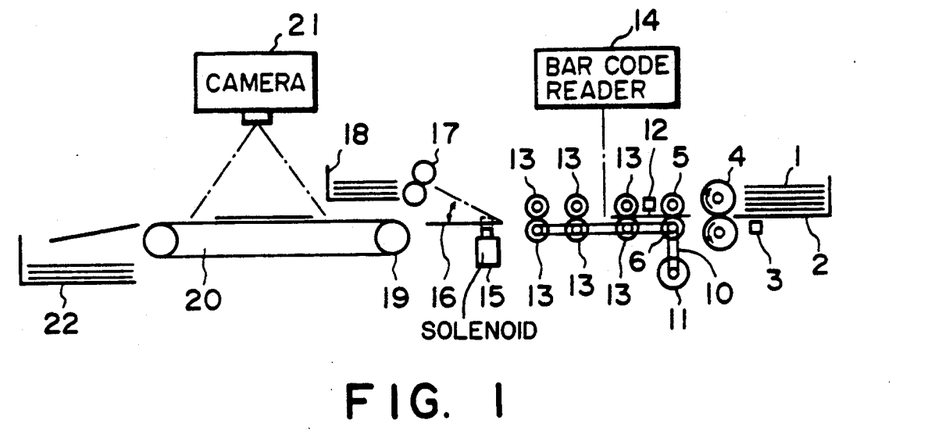
FIG. 1 is a schematic view showing an image reading apparatus according to a preferred embodiment of the present invention.

First of all, a first embodiment of the present invention will be explained with reference to FIGS. 1 to 4, and the construction thereof will be explained in connection with FIGS. 1 and 2.

Figure 2:
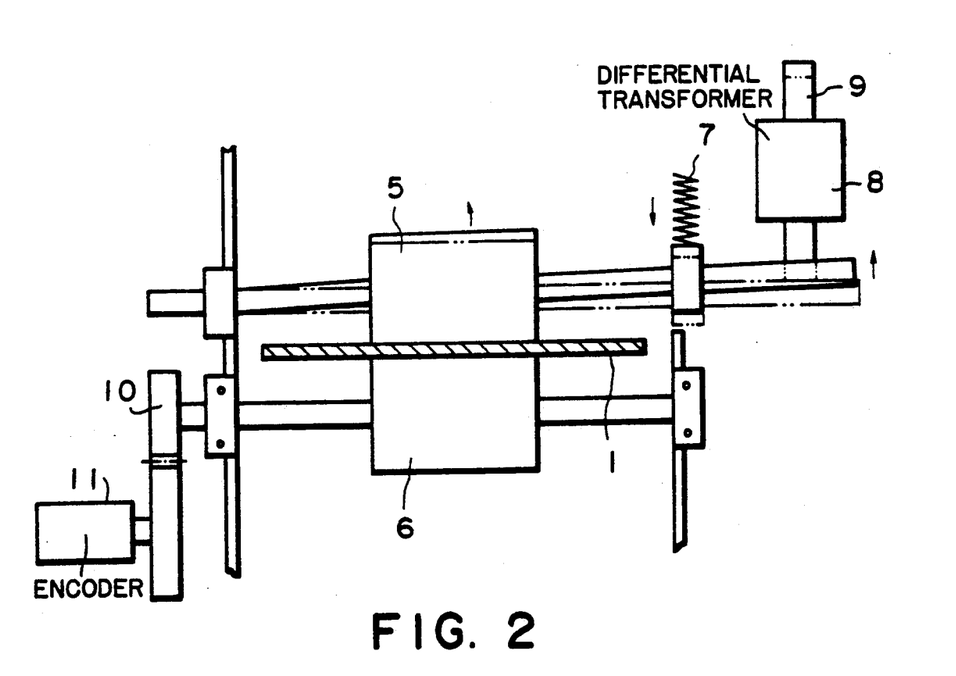
FIG. 2 is an enlarged plan view of a main portion of the apparatus of FIG. 1.

The image reading apparatus according to the first embodiment includes a supply tray 2 on which originals 1 each having code information thereon are stacked, a paper feed detection sensor 3 for detecting the presence of the originals 1 in the tray 2, feed rollers 4 for feeding the original to a detecting means, and a double-feeding detection roller 5 which is mounted for movement in an up-and-down direction, as shown in FIG. 2. An overlap-feeding detection roller 6 is arranged in confronting relation to the double-feeding detection roller 5. A bias spring 7 for holding the roller 5 in a predetermined position is arranged in the vicinity of an end of a center shaft of the roller 5, and said end of the shaft is abutted against a shaft 9 of a differential transformer 8. With this arrangement, the thickness of the original or originals 1 being passed through the roller 5 can be detected by moving the double-feeding detection roller 5 upwardly in response to the thickness of the original to cause the corresponding upward movement of the shaft 9 which causes the transformer 8 to generate an output corresponding to the amount of movement of the shaft 9. The overlap-feeding detection roller 6 is connected through a driving belt 10 to an encoder 11 which can detect the length of the original 1 being fed, by outputting pulses corresponding to the timing of the presence of detection by means of an original detection sensor 12.

The reference numeral 13 designates conveying rollers for conveying the original 1; 14 designates a bar code reader as a means for reading the code information on the original 1; 15 designates a solenoid which is energized to be extended when the abnormal original (due to the double-feeding and/or the overlap-feeding) is detected or when the code bar is erroneously read; and 16 designates a feeding path guide which can be changed in position by the solenoid 15. The reference numeral 17 designates ejector rollers for feeding the abnormal original onto an abnormal original receiving tray 18; and 19 designates a driving roller for driving a conveyor belt 20 which feeds out the normal original onto a normal original receiving tray 22. A camera 21 as a recording means for photographing the original is arranged above the conveyor belt 20.

Figure 3:
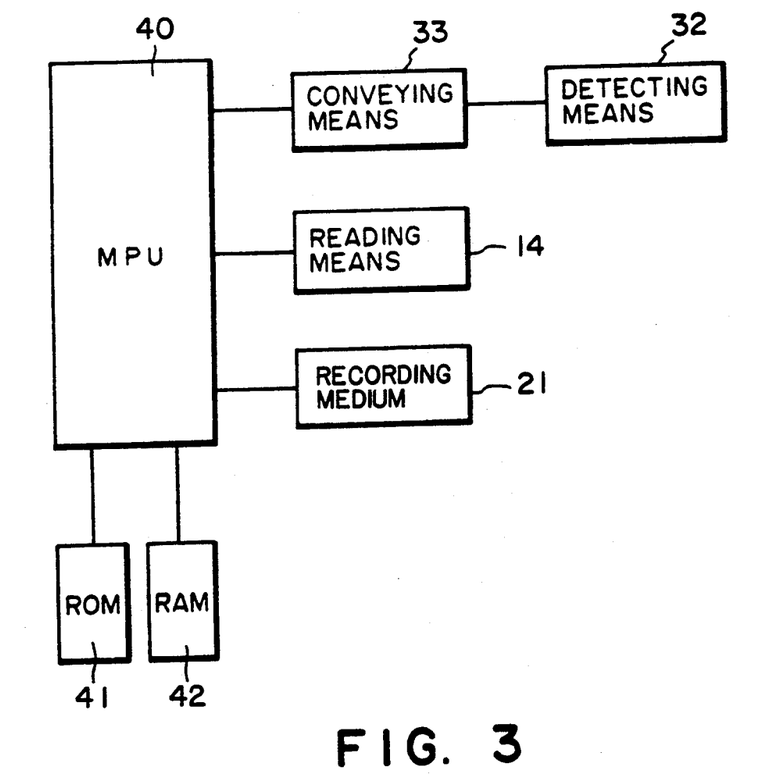
FIG. 3 is a block diagram of a control arrangement for the apparatus of FIG. 1.
Figure 4:
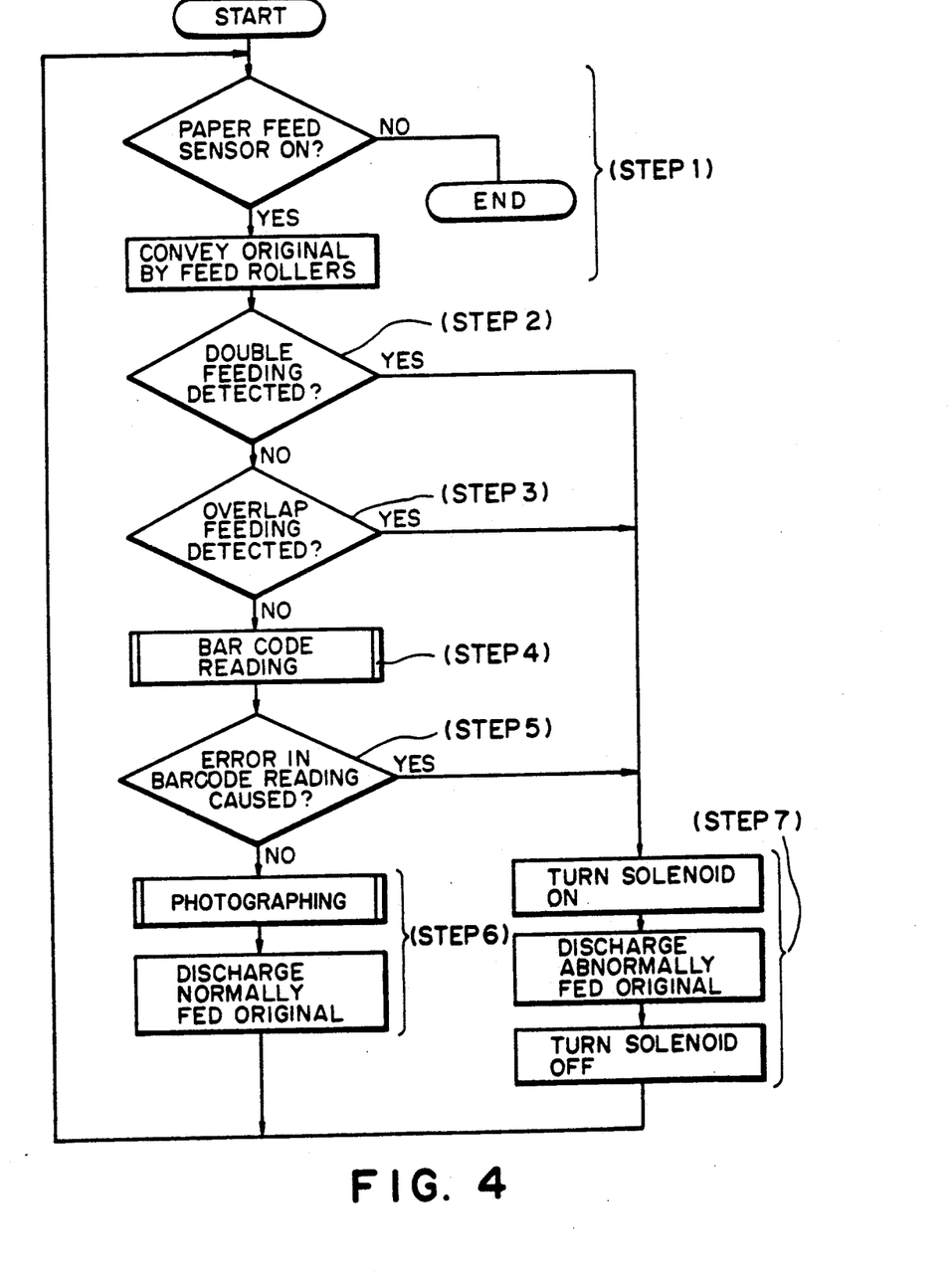
FIG. 4 is a flow chart showing the operation of the apparatus of FIG. 1.

Next, an example of the operation of the apparatus according to the first embodiment will be explained with reference to FIGS. 3 and 4.

In the illustrated embodiment, the abnormal original detecting means 32 comprises a double-feeding detection means and an overlap-feeding detection means, and the conveying means 33, reading means 14 and recording means 21 are controlled by a one-chip microcomputer 40 having memories (RAM 42, ROM 41).

A reference value for the double-feeding detection means is determined as follows. First of all, a single sample original (or actually used original) having a predetermined dimension (thickness and length) is passed between the double-feeding detection roller 5 and the overlap-feeding detection roller 6. In this case, the double-feeding detection roller 5 is shifted upwardly by an amount corresponding to the thickness of the sample original, with the result that the shaft 9 of the transformer 8 is lifted by an amount corresponding to the shift of the roller 5. Consequently, the differential transformer 8 emits an output corresponding to the difference between the amount of lifting movement of the roller 5 and that of the shaft 9. This output is set as a double-feeding detection reference value (used for judging the condition that two or more originals each having the predetermined thickness are doubled) and is stored in the memory 42 (RAM).

On the other hand, a reference value for the overlap-feeding detection means is determined as follows. The rotation of the overlap-feeding detection roller 6 is continued during the duration from when the original sensor 12 detects the leading edge of the sample original to when the original sensor detects the trailing edge of such sample original and is transmitted through the driving belt to the encoder 11, which outputs the number of pulses corresponding to an amount of rotation thereof. The number of such pulses is set as an overlap-feeding detection reference value used for judging the condition that two or more originals each having the predetermined length are overlapped in the feeding direction, and is stored in the memory 42 (RAM). In this way, the setting of the reference values are completed.

When the originals (each having the same dimension as that of the sample original) each having the bar code applied thereto are set on the supply tray 2, the paper feed detection sensor 3 detects the presense of the original 1. After a predetermined timing, the original 1 is fed by the feed rollers 4 to the nip between the double-feeding detection roller 5 and the overlap-feeding detection roller 6 (STEP 1). After the original has passed through the nip, the value of the thickness of the original is obtained from the output value of the differential transformer 8, which thickness value is compared with the double-feeding detection reference value. If the thickness value is noticeably larger than the reference value, it is judged that double-feeding has occurred (STEP 2). Similarly, the value of the length of the original is obtained from the counted number of pulses emitted from the encoder 11, which length value is compared with the overlap-feeding detection reference value. If the length value is noticeably larger than the reference value, it is judged that overlap-feeding has occurred (STEP 3). The originals which are judged to be included in double-feeding or overlap-feeding are treated as the abnormal originals, and the bar codes thereof are not read. The abnormal original is fed by the conveying rollers 13 to the solenoid 15. In this point, the feeding path guide 16 is deflected toward the ejector rollers 17 by the extension of the solenoid 15. Accordingly, the abnormal original is fed to the ejector rollers 17 through which the abnormal original is ejected onto the abnormal original receiving tray 18 (STEP 7).

On the other hand, the original 1 judged as the normal original is fed to the bar code reader 14, where the bar code of the original is read (STEP 4). Thereafter, it is judged whether the bar code is correctly read or not (STEP 5). If an error in the bar code reading occurs, the original is ejected onto the abnormal original receiving tray 18 in the same manner as the above-mentioned STEP 7; whereas, if the bar code is correctly read, the original 1 is conveyed by the conveyor belt 20, during which the original is photographed by the camera 21 at a predetermined position, and then the original is ejected onto the normal original receiving tray 22 (STEP 6).

Figure 5:
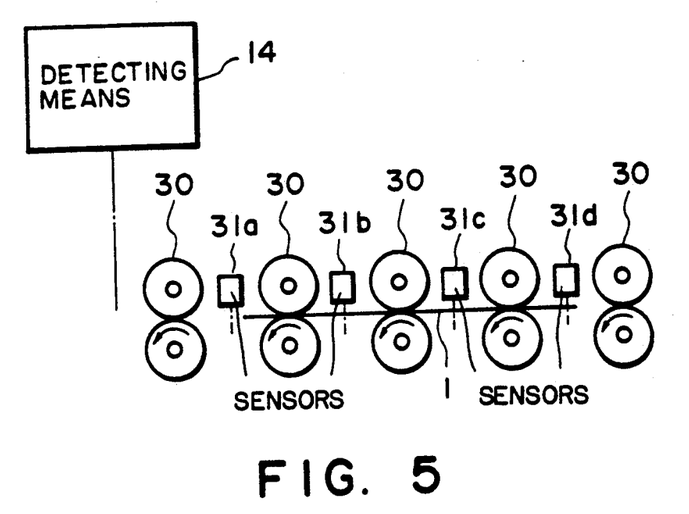
FIGS. 5 and 6 are enlarged sectional views showing main portions of an image reading apparatus according to a second embodiment of the present invention.
Figure 6:
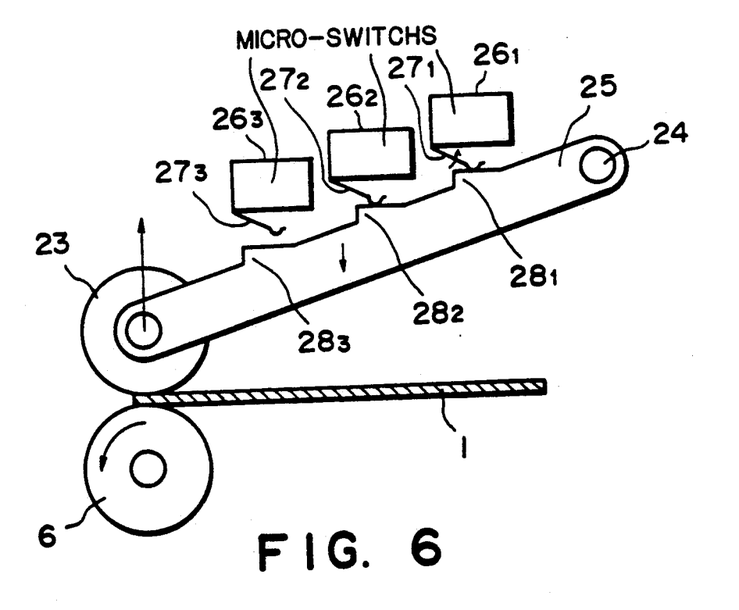

FIGS. 5 and 6 show a second embodiment of the present invention, where the same elements as those of the first embodiment will be designated by the same reference numerals used in the first embodiment.

In the second embodiment, as shown in FIG. 5, the overlap-feeding detection means comprises a plurality of pairs of conveying rollers 30, and a plurality of original sensors 31a, 31b, 31c, 31d each arranged between the adjacent roller pairs 30 for detecting the presence of the original 1. In this case, the length of the original can be determined by the fact that, when the last original sensor 31a detects the leading edge of the original, it is judged which sensor among the remaining sensors 31b, 31c, 31d detects the original 1. That is to say, in this embodiment, after the length of the sample original has been set as the overlap-feeding detection reference value, by comparing the length of the original 1 being actually fed with the reference value, it can be judged whether the overlap-feeding occurs or not.

Accordingly, in this embodiment, since the overlap-feeding detection means is arranged in the conveying system (between the conveying rollers), the conveying system can be compact.

On the other hand, in the second embodiment, as shown in FIG. 6, the double-feeding detection means comprises a detection roller 23, and a rocking arm 25 having one end connected to a center shaft of the roller 23 and the other end connected to a pivot 24 around which the rocking arm can rotate. The rocking arm 25 is provided at its upper surface with a plurality (three, in the illustrated embodiment) of projections $28_1$–$28_3$ cooperating with levers $27_1$–$27_3$ of corresponding microswitches $26_1$–$26_3$. These projections $28_1$–$28_3$ and microswitches $26_1$–$26_3$ are arranged in different vertical positions, respectively. With this arrangement, when the roller 23 is shifted upwardly by an amount corresponding to the thickness of the sample original being fed, the maximum upward movement of the rocking arm 25 caused by the shift of the roller 23 causes the projection $28_1$ or $28_2$ to activate the microswitch $26_1$, $26_2$. On the basis of the activated microswitch, the thickness value of the sample original is set as the double-feeding detection reference value which is stored in the memory. For example, it is assumed that, when the sample original is fed, the microswitches $26_1$ and $26_2$ are activated. In this case, when the original 1 is actually fed, if the thickness of the original exceeds the predetermined value, i.e., if two or more originals are fed in the stacked condition, the microswitch $26_3$ is activated, thus detecting the double-feeding.

Accordingly, in this embodiment, by utilizing a plurality of microswitches as the double-feeding detection means, double-feeding can be detected with simpler construction than that of the first embodiment.

The construction and function of the other elements are the same as those of the first embodiment, and, thus, the detailed explanation thereof will be omitted.

According to the above-mentioned embodiments, since the means for detecting the thickness and the length of the original are provided, it is possible to positively discriminate the normal original from the abnormal original.

Further, since the reference values for the detection means can be set at will, an original having any dimension can be used.

Furthermore, since the reference values regarding the dimension of the original can be easily set merely by feeding the sample original, the setting operation can be simplified.

In addition, since useless reading is abbreviated to keep the scanner portion of the bar code reader using the laser in an inoperative condition, the service life of the scanner can be extended.

What is claimed is:

1. An image recording apparatus for recording onto a recording medium an original on which is disposed information for distinguishing the original, comprising:

conveying means for conveying the original along a predetermined conveying path;

recording means arranged along the conveying path, for recording an image on said original onto a recording medium;

detection means for detecting a thickness and a length of the original being fed by said conveying means, said detection means being disposed on an upstream side of said recording means with respect to an original conveying direction;

memory means for storing a reference value which corresponds to a thickness and a length of a sample original detected by said detection means;

reading means, disposed between said recording means and said detecting means along the conveying path, for reading the distinguishing information disposed on the original;

first judging means for judging, through comparison of the reference value stored in said memory means and the original's thickness and length detected by said detecting means, whether the original is conveyed normally or not;

second judging means for judging whether said reading means reads the distinguishing information normally or not; and control means for controlling said recording means to cause (1), when said first judging means judges the abnormal conveying state or when said second judging means judges the abnormal reading state, said recording means not to record the original, and (2), when said first judging means judges the normal conveying state and said second judging means judges the normal reading state, said recording means to record the original.

2. An image recording apparatus according to claim 1, further comprising a second conveying path branched from the course of said conveying path, and switching means for switching the original to said second conveying path selectively, whereby said switching means is switched based a result judged by said first and second judging means.

3. A sheet recording apparatus for recording onto a recording medium a sheet-like original to which information for distinguishing the original is added, comprising:

conveying means for conveying the original along a predetermined conveying path;

first detecting means for detecting an occurrence of abnormal original conveying;

reading means disposed downstream of said first detection means along said conveying path, for reading the information added to the original;

recording means for recording onto the recording medium the original conveyed along the conveying path;

second detecting means for detecting whether erroneous reading of the added information has occurred or not; and control means for controlling said recording means to cause (1), when said first detecting means detects the abnormal conveying or said second detecting means detects the erroneous reading, said recording means not to record the original, and (2), when said first and second judging means judge the normal conveying and correct reading respectively, said recording means to record the original.

4. An image recording apparatus according to claim 3, wherein said first detecting means detects double feeding of the sheets by measuring a thickness of the original.

5. An image recording apparatus according to claim 3, wherein said first detecting means detects whether plural originals are conveyed partially overlapped or not, by measuring a length of the original.

6. An image recording apparatus according to claim 3, further including a first tray for receiving an original which is detected as being abnormally conveyed or as having an erroneous reading, a second tray for receiving an original which is detected as being normally conveyed and having correct reading, and a switching means for conveying the original passed through a reading position of said reading means to said first tray or said second tray, said switching means being switched in response to the detections of said first and second detecting means.

7. An image recording apparatus according to claim 6, wherein said first detecting means detects whether the originals are fed in an overlapped condition or not.

8. An image recording apparatus according to claim 6, wherein said conveying path is branched into a first path and a second path, said recording means being disposed along said second path, the original passed through said first path being conveyed to said first tray, the original passed through the second path being conveyed to said second tray.

9. An image recording apparatus according to claim 6, wherein the information added to the original comprises a bar code, and said recording means comprises a bar code scanner.

10. An image recording apparatus according to claim 6, wherein the reading of the information by said reading means is interrupted when abnormal conveying is detected by said first detecting means.

11. An image recording apparatus according to claim 3, further including a first tray for receiving an original which is detected as being abnormally conveyed or as having erroneous reading, a second tray for receiving an original which is detected as being normally conveyed and as having correct reading, and a switching means for conveying the original passed through a reading position of said reading means to said first tray or said second tray, said switching means being switched in response to the detections of said first and second detecting means.

12. An image recording apparatus according to claim 6, wherein said first detecting means detects whether the originals are fed in an overlapped condition or not.

* * * * *

UNITED STATES PATENT AND TRADEMARK OFFICE
CERTIFICATE OF CORRECTION

PATENT NO. : 5,131,648

DATED : July 21, 1992

INVENTOR(S) : ITO

It is certified that error appears in the above-identified patent and that said Letters Patent is hereby corrected as shown below:

IN THE DRAWINGS

SHEET 4

Fig. 5, "MICRO-SWITCHS" should read --MICRO-SWITCHES--.

COLUMN 1

Line 49, "photographing." should read --photographed.--.
    Line 50, "photo-taking," should read --photographing,--.

COLUMN 2

Line 3, "non-taken)" should read --non-photographed)--.
    Line 16, "the" should read --an--.
    Line 25, "an" should read --to--.

COLUMN 3

Line 31, "code bar" should read --bar code--.
    Line 33, "position" should read --its position--.

COLUMN 4

Line 39, "the abnormal" should read --abnormal--.
    Line 41, "In" should read --At--.

COLUMN 6

Line 40, "based" should read --based on--.
    Line 51, "tection" should read --tecting--.
    Line 67; "An image recording apparatus" should read --A sheet recording apparatus--.

UNITED STATES PATENT AND TRADEMARK OFFICE
CERTIFICATE OF CORRECTION

PATENT NO. : 5,131,648
DATED : July 21, 1992
INVENTOR(S) : ITO

It is certified that error appears in the above-identified patent and that said Letters Patent is hereby corrected as shown below:

COLUMN 7

Lines 3, 7, 18, and 21. In each line, "An image recording apparatus" should read --A sheet recording apparatus--.

COLUMN 8

Lines 3, 7, 11, and 22  In each line, "An image recording apparatus" should read --A sheet recording apparatus--.

Signed and Sealed this

Twenty-first Day of September, 1993

Attest:

BRUCE LEHMAN

*Attesting Officer*    *Commissioner of Patents and Trademarks*